United States Patent [19]

Earnhardt

[11] Patent Number: 5,113,705
[45] Date of Patent: May 19, 1992

[54] FUNCTIONAL TESTING OF SOLENOID VALVES IN AIR

[75] Inventor: Daniel E. Earnhardt, Seaford, Va.

[73] Assignee: Siemens Automotive L.P., Auburn Hills, Mich.

[21] Appl. No.: 631,581

[22] Filed: Dec. 21, 1990

[51] Int. Cl.⁵ .......................................... G01M 19/00
[52] U.S. Cl. ........................................ 73/168; 73/4 R
[58] Field of Search .............. 73/4 R, 37, 118.1, 168, 73/39, 40, 121

[56] References Cited

U.S. PATENT DOCUMENTS

| | | | |
|---|---|---|---|
| 4,557,136 | 12/1985 | Greenhalf | 73/4 R |
| 4,615,722 | 10/1986 | Steffan et al. | 73/4 R X |
| 4,766,765 | 8/1988 | Ezekoye | 73/4 R X |
| 4,893,494 | 1/1990 | Hart | 73/168 |

Primary Examiner—William A. Cuchlinski, Jr.
Assistant Examiner—G. Bradley Bennett
Attorney, Agent, or Firm—George L. Boller; Russel C. Wells

[57] ABSTRACT

A solenoid valve that is to be used to control flow of a liquid medium is tested in a test fixture which applies a leak test, a flow test, and a response test using a gas as a test medium. The test results are compared with a test specification that has been previously derived from an established correlation of tests using gas as a test medium versus liquid as a test medium. The invention enables the valves to be tested with gas instead of liquid.

10 Claims, 9 Drawing Sheets

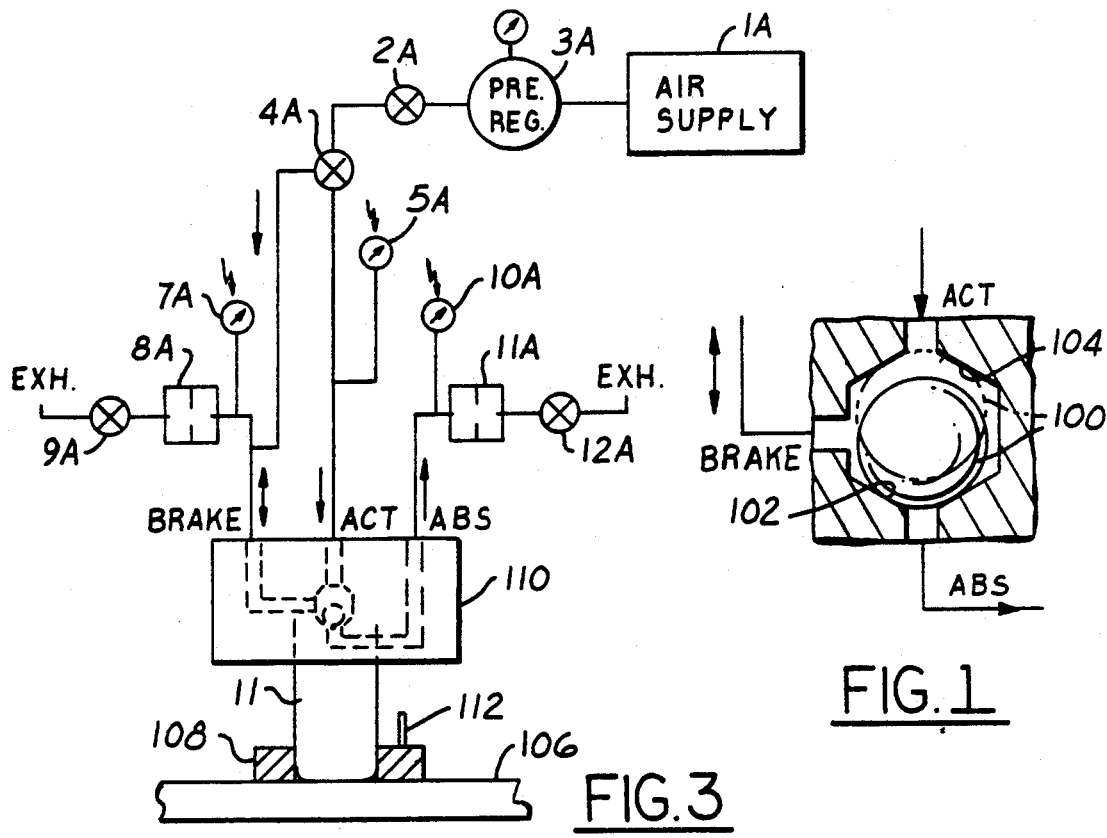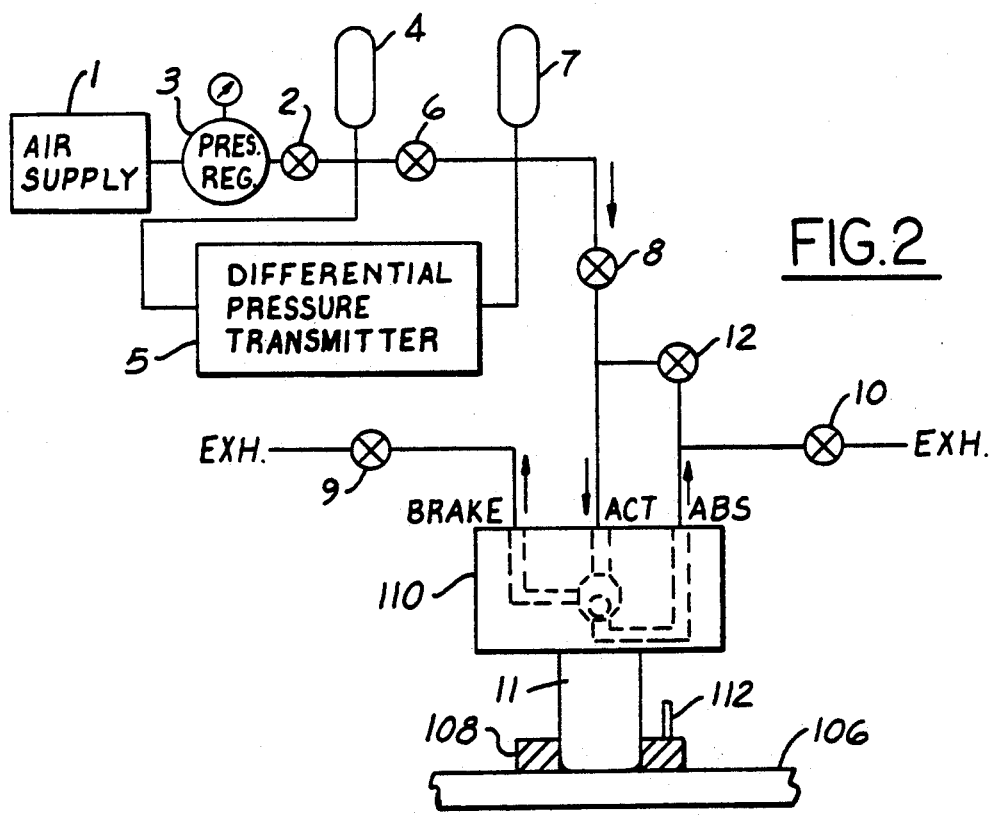

ENERGIZED VALVE SEAT LEAK TEST

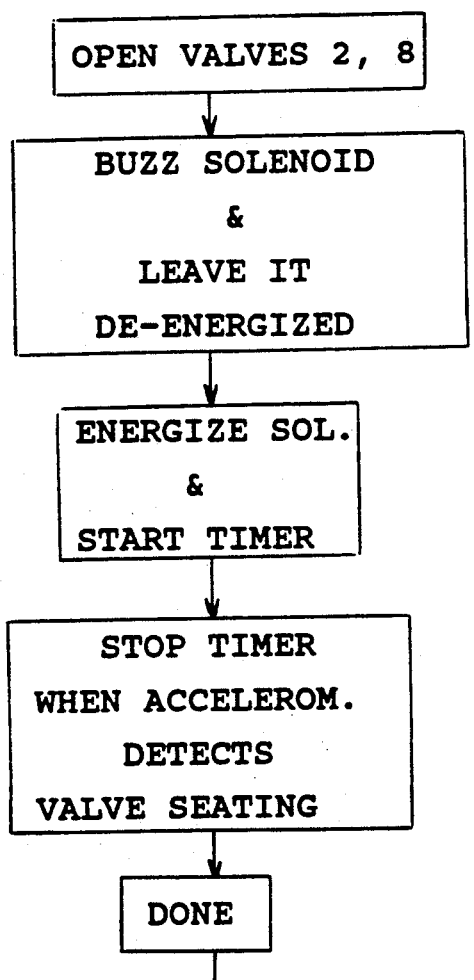
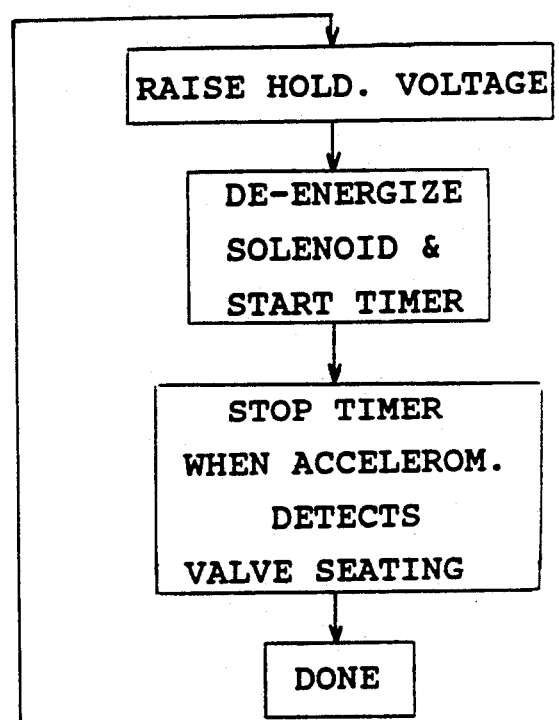
FIG. 8

FUNCTIONAL TESTING OF SOLENOID VALVES IN AIR

FIELD OF THE INVENTION

This invention relates generally to test apparatus and methods, particularly for testing solenoid valves.

BACKGROUND AND SUMMARY OF THE INVENTION

Certain solenoid valves are required to comply with rather rigid functional specifications. An example of a solenoid valve of this type is found in an automotive vehicle ABS brake system. A typical three-way ABS solenoid valve is required to exhibit close compliance with a specified opening time, a specified closing time, specified seat leak rates for both energized and de-energized conditions, and specified flow rates for both energized and de-energized conditions. It is also typical practice to subject each solenoid valve to testing for assuring compliance with these specifications.

Since ABS solenoid valves are required to handle automotive brake fluid when they are in use, it had been a typical practice to functionally test each valve using either brake fluid itself or some sort of equivalent liquid fluid. When brake fluid itself was used for the testing medium, the testing was particularly expensive. Not only is brake fluid itself costly, but it also requires special handling equipment because of its inherent chemical properties. Typically, mechanical test equipment must be fabricated from stainless steel since brake fluid contact tends to remove paint and degrades most plastics. Electrical wiring had to be teflon-coated in order to resist damage. Because brake fluid is also hydroscopic, it tends to promote rust as well. Because of these factors, it would be especially beneficial if the solenoid valves could tested in dry air rather than in wet liquid. Others have attempted to develop apparatus and methods for the dry air testing of the solenoid valves, but it is believed that at most only limited success has been achieved. To the extent that others may actually be performing dry air testing of this type of solenoid valve, it is believed that such testing is conducted using very high air pressures, for example greater than 14 Bar. The use of such high air pressures requires relatively more expensive test equipment and the use of such high air pressures is a potential source of danger if care is not taken.

The present invention relates to new and unique test apparatus and methods for testing solenoid valves in dry air at comparatively low pressures in a manner that reliably correlates the dry air test results with results that would be obtained by equivalent testing using liquid media such as brake fluid. Thus, the disadvantages that are associated with the wet testing of solenoid valves, as described above, can be avoided. This in turn yields meaningful economies in the mass production of solenoid valves.

One aspect of the invention relates to apparatus and method for the pressure decay testing of solenoid valves in air which correlates with extremely small leak rates of brake fluid at a very high pressure differential, such as a 138 Bar pressure differential.

Another aspect of the invention relates to measurement of the on and off response times of the solenoid valve and incorporates an accelerometer that is mounted on the valve test fixture for detecting the initial seating of the valve element on a valve seat in response to respective energization and de-energization of the solenoid valve. A further aspect of the invention relates to apparatus and method for the flow rate testing of the solenoid valve by utilizing orifices and pressure transducers in particular configurations with the valve under test.

Although the present description of the invention is given for the testing of a particular three-way ABS solenoid valve, it is to be appreciated that the inventive principles may be applied to the testing of other types of high performance solenoid valves.

The foregoing features, advantages and benefits of the invention will be seen more fully in the ensuing description and claims. Drawings accompany the disclosure and illustrate a preferred embodiment of the invention according to the best mode contemplated at the present time for carrying out the invention.

BRIEF DESCRIPTION OF THE DRAWINGS

FIG. 1 is a fragmentary cross-sectional view through a portion of a representative three-way solenoid valve that can be tested with the apparatus and method of the present invention.

FIG. 2 is a schematic diagram illustrating a portion of the test apparatus.

FIG. 3 is a schematic diagram illustrating a second portion of the test apparatus.

FIG. 8 is a block diagram illustrating steps of fourth and fifth tests in the sequence of FIG. 4.

DESCRIPTION OF THE PREFERRED EMBODIMENT

Figure 4:
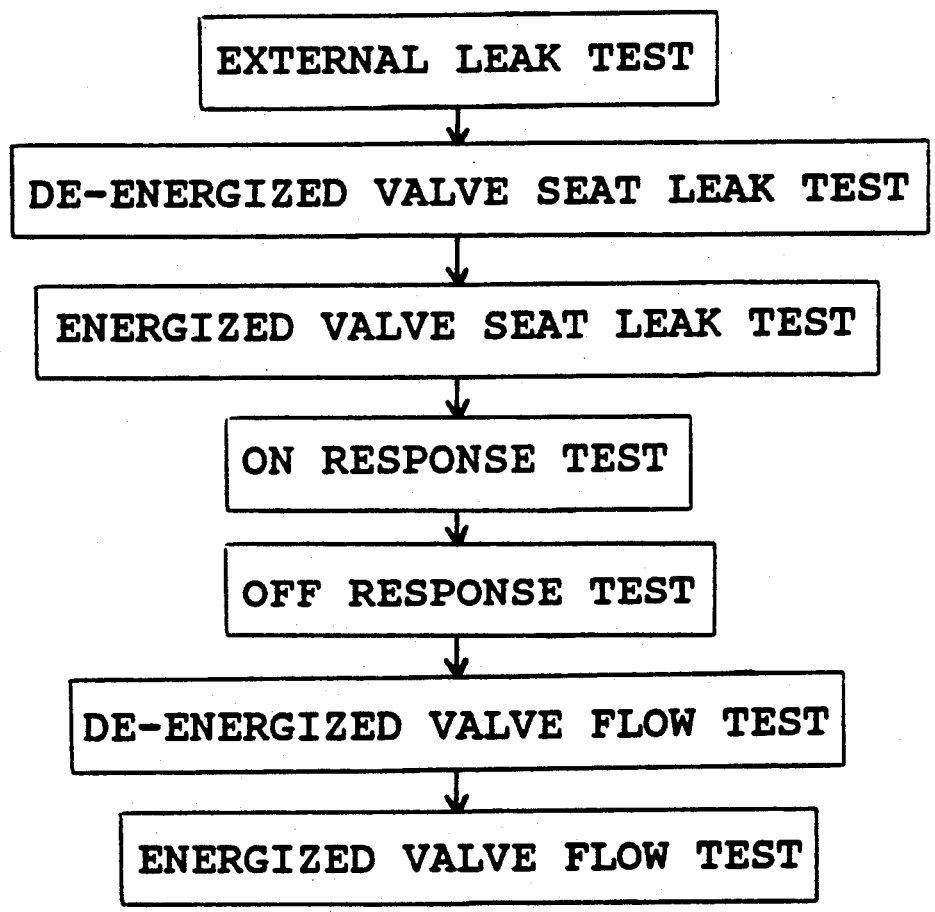
FIG. 4 is a block diagram illustrating a sequence of tests that are performed by the test apparatus of FIGS. 2 and 3 on a solenoid valve.

The present invention will be described for the testing of a three-way solenoid valve. It is to be understood, however, that certain principles of the invention may be applied to testing of two-way valves as well. FIG. 1 depicts a typical construction for the valving portion of a three-way valve. The valve body contains a valve element in the form of a sphere 100 that is operable to control the communication between three ports of the valve. These ports are identified as an ACT port, a BRAKE port and a ABS port. The solid line position of sphere 100 is the one assumed by the valve when the valve's solenoid is de-energized. In this position, the sphere seats on the ABS seat 102 to close the ABS port while concurrently placing the ACT and BRAKE ports in fluid communication. The broken line position of sphere 100 is the one assumed when the solenoid is energized. In this position sphere 100 seats on the ACT seat 104 to close the ACT port while concurrently allowing communication between the ABS and BRAKE ports.

For testing each solenoid valve is supported on a test fixture 106 in a suitable manner. The illustrated test fixture shown in FIGS. 2 and 3 comprises a nest 108 which receives one end of the solenoid valve. The test apparatus further includes a head 110 that separably mates with the opposite end of the solenoid valve in a manner that when mated provides respective leak-proof fluid connections to each of the respective three ports of the valve, namely, the ACT, the BRAKE, and the ABS ports.

The portion of the test apparatus shown in FIG. 2 comprises an air supply 1, a shut-off valve 2, a pressure regulator 3, a confined volume (schematically shown as an accumulator) 4, a differential pressure transmitter 5, a shut-off valve 6, a confined volume (schematically shown as an accumulator) 7, a shut-off valve 8, a shut-off valve 9, a shut-off valve 10, and a shut-off valve 12. These components are connected in a pneumatic circuit as schematically represented by the drawing figure. A portion of the test apparatus shown in FIG. 2 is used to perform the following tests on the solenoid valve: an external leak test; a de-energized valve seat leak test; an energized valve seat leak test; an on response time test; and an off response time test. The solenoid valve under test is designated 11.

That portion of the test apparatus which is shown in FIG. 3 comprises an air supply 1A, a shut-off valve 2A, a pressure regulator 3A, directional valve 4A, a pressure transducer 5A, a pressure transducer 7A, a flow orifice 8A, a shut-off valve 9A, a pressure transducer 10A, a flow orifice 11A, and a shut-off valve 12A. The fact that FIG. 3 contains differently numbered parts from FIG. 2 should not necessarily be construed to preclude usage of components from FIG. 2 to accomplish the function of FIG. 3. For example, the function of FIG. 3 could be achieved by adding to the system of FIG. 2 two additional selector valves, the orifices, and the pressure transducers. In this way, all functions can be accomplished by the same plumbing with the two additional selector valves serving to select either the configuration of FIG. 2 or that of FIG. 3. Although not specifically illustrated in the drawing figures, it should be understood that the test apparatus includes selector valves that are effective to selectively connect each respective portion of the test apparatus in the respective FIGS. 2 and 3 to head 110 for the performance of the respective tests. For example, such selector valves could be located in the three lines that lead to the three ports of the solenoid valve.

FIG. 4 illustrates a sequence of seven tests that are conducted on each solenoid valve by means of the test apparatus illustrated in FIGS. 2 and 3. That portion of the apparatus portrayed by FIG. 2 is used to perform the first five steps of the sequence while that portion of the test apparatus illustrated in FIG. 3 is used to perform the last two tests of the sequence.

Figure 5:
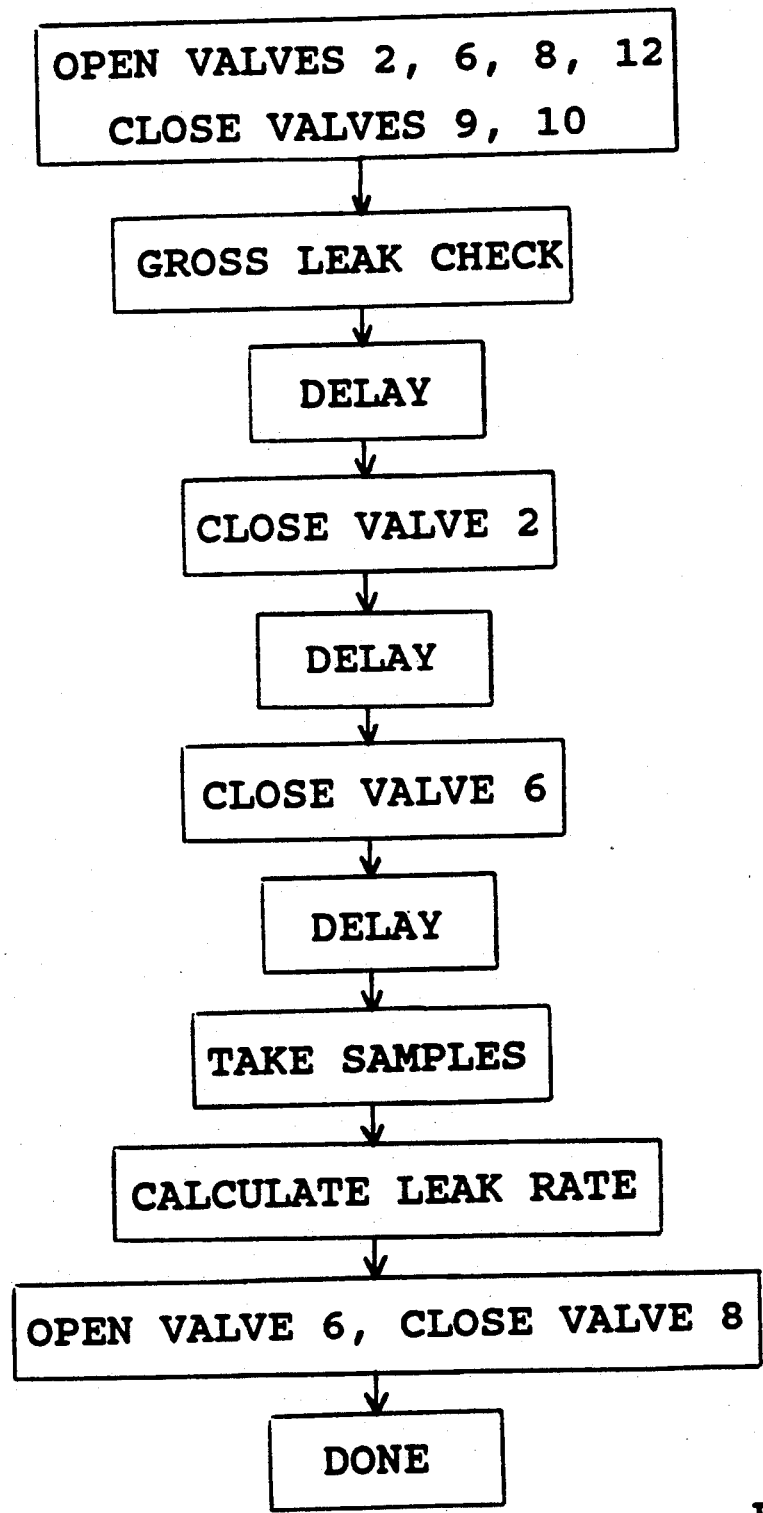
FIG. 5 is a block diagram illustrating the steps of one of the tests performed in the sequence of FIG. 4.

The first test performed on the solenoid valve is an external leak rate test and this test comprises a sequence of steps that are illustrated by the block diagram of FIG. 5. The purpose of the external leak rate test is to verify that one or more internal o-ring seals in the solenoid valve comply with an external leak rate specification. The test is performed with the solenoid valve de-energized by applying a preselected pressure to both the ACT and ABS ports of the solenoid valve. To cause the appropriate pressure to be so applied, valves 2, 6, 8 and 12 are opened while valves 9 and 10 are closed. If the valve under test is in compliance with the applicable external leak rate specification, the external leak rate that is measured by the external leak rate test will be less than a certain value. Otherwise, the valve will be deemed in non-compliance. The conduct of this test requires first a determination that the valve does not have a gross leak. The test apparatus and method that is utilized therefore first requires a gross leak check. A gross leak may occur for different reasons such as the omission or gross failure of an O-ring seal. In such a case there will be a substantial flow into the ACT port of the valve even though the BRAKE and ABS ports are closed. The test apparatus is designed such that the flow from the air supply through valve 2, pressure regulator 3, valve 6 and valve 8 will create a pressure drop in its path that is capable of being detected by differential pressure transmitter 5. The differential pressure transmitter detects the pressure difference between a point in the line between pressure regulator 3 and valve 6 and a point in the line between valve 6 and valve 8. The detection of a pressure differential exceeding a predetermined value will cause the solenoid valve under test to be deemed to have a gross leak in which case the solenoid valve is deemed non-compliant and is not subject to any further tests in either this particular test or in the remaining steps of the sequence of FIG. 4.

If, on the other hand, the valve under test is found not to have a gross leak, then the external leak rate test is continued. The continuance of this test comprises a delay, followed by a closing of valve 2, followed by a further delay, followed by a closing of valve 6, followed by a further delay. The delay that occurs after the determination that the valve under test does not have a gross leak enables confined volumes 4 and 7 to be charged to essentially the preset pressure established by pressure regulator 3 (414 kPA), and this pressure will also be found at both the ACT and ABS ports of the valve under test. The closing of valve 2 prevents any loss of pressure in the circuit from being replenished from the supply air 1. The closing of valve 6 isolates confined volume 4 from confined volume 7.

At this point it should be explained that there is no flow path through differential pressure transmitter 5. If there is leakage in the solenoid valve under test, then air pressure will begin to decrease downstream of valve 6. Such decrease in air pressure is detected by differential pressure transmitter 5.

A preferred procedure for measurement of pressure loss involves taking a number of sample measurements by means of differential pressure transmitter 5. For example, a typical procedure may comprise taking twenty measurements at intervals of one-quarter of a second.

Figure 6:
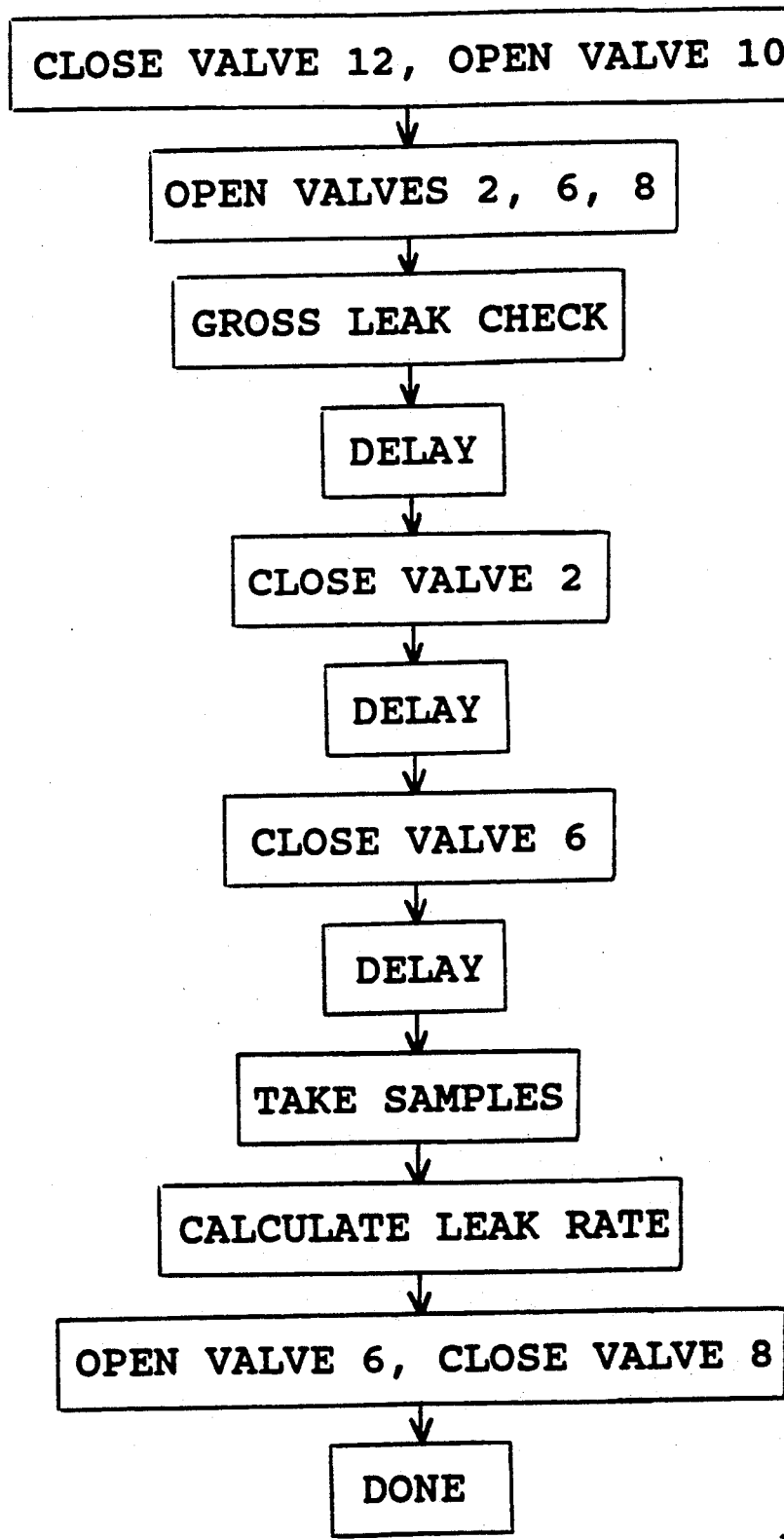
FIG. 6 is a block diagram illustrating steps of a second of the tests in the sequence of FIG. 4.

From these measurements the average pressure change per unit time was derived using linear regression to calculate a slope of the best fit straight line through the measurement samples. This average pressure rate change correlates with a leak rate and therefore can be used to determine whether or not the valve under test complies with the appropriate external leak rate specification. If the valve is found in compliance, then the test sequence proceeds to the second test whose details are presented in FIG. 6.

This is a de-energized valve seat leak rate test. The purpose is to check the leakage rate between the ACT and ABS ports when sphere 100 is closing the ABS port (i.e. solid line position of FIG. To perform this test, valve 12 is closed and valve 10 is opened. Valves 2, 6 and are also opened to recharge the system and the valve under test. However, as was true in the case of the external leak test, it is also necessary to perform a gross leak check since if the gross leak check were not performed and the valve under test were, in fact, a gross leaker, the measurements subsequently taken by differential pressure transmitter 5 would give the appearance that the valve under test is in compliance. If the valve under test is found not to have a gross leak, then valves 2 and 6 are closed with appropriate delays, as was also done for the external leak test. After the closing of valve 6 and the ensuing delay, sample measurements are taken by differential pressure transmitter 5; once again this can be a series of twenty measurements at one-quarter second intervals. The average pressure change per unit time is derived using linear regression to calculate the slope of the best fit straight line through the measurement samples. This average pressure change per unit time correlates with actual brake fluid leak rate through the valve and is used to determine whether or not the valve is in compliance with the de-energized valve seat leak rate specification. If the valve is found in compliance testing continues; otherwise the valve is deemed non-compliant and further testing terminated. At the completion of the measurements, valve 8 is closed and valve 6 opened for re-establishing regulated pressure in the circuit upstream of valve 8.

At this point it should be mentioned that the purpose of valve 8 is to avoid shocking differential pressure transmitter 5 with extremely large pressure differentials across it. That is why valve 8 may be referred to as a pressure save valve.

Figure 7:
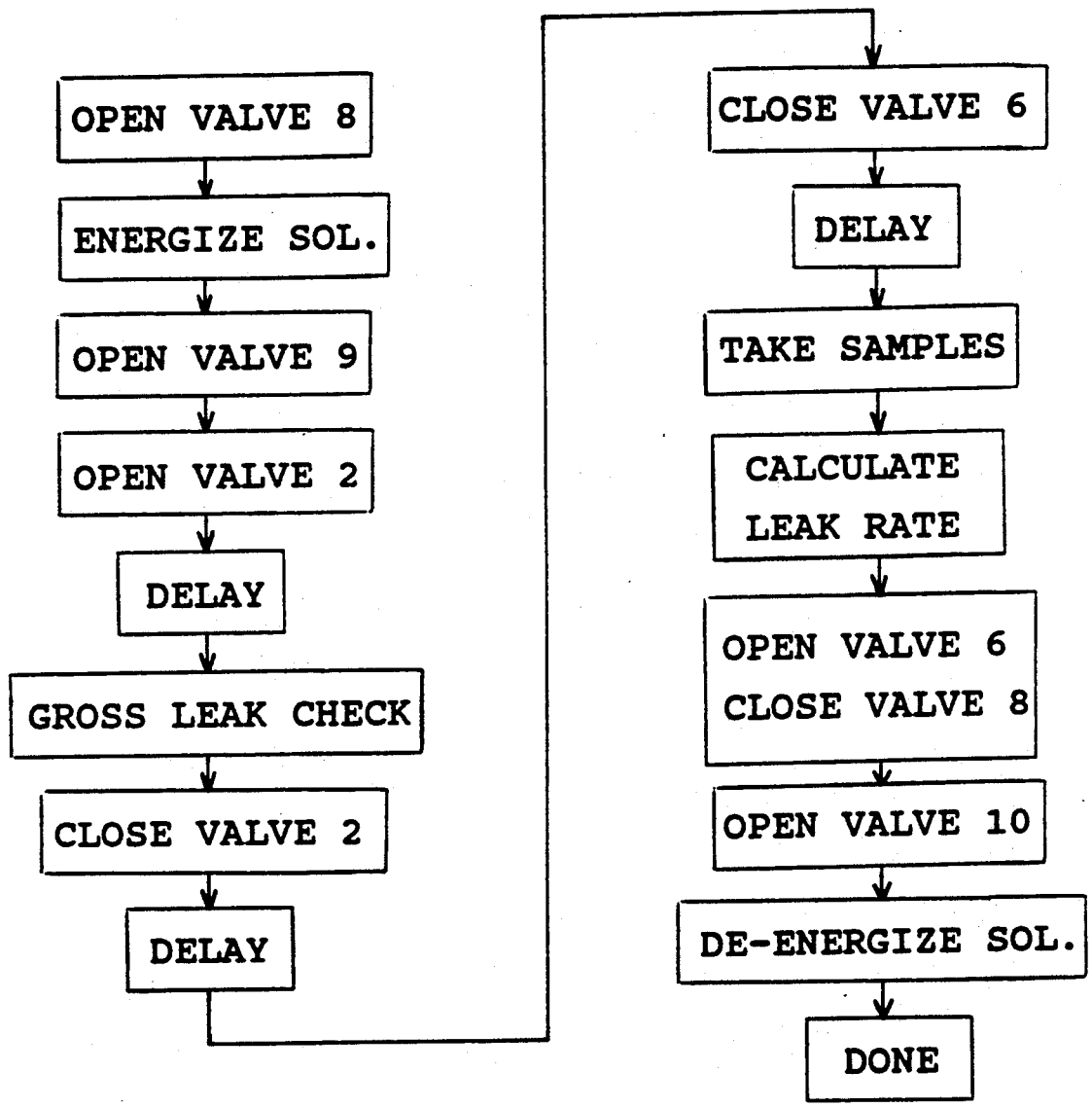
FIG. 7 is a block diagram illustrating steps of a third of the tests in the sequence of FIG. 4.

The next test performed is the energized valve seat leak rate test. The sequence of steps are illustrated in FIG. 7. Valve 8 is opened and the solenoid of the valve under test is energized with an appropriate energizing voltage. This causes the sphere to assume the broken line position that is illustrated in FIG. 1. Valve 9 and valve 2 are also opened and after a delay a gross leak check is performed. If a gross leak is found, the valve is deemed non-compliant and further testing terminated. If the valve is found not to have a gross leak, then the test continues by closing valves 2 and 6 with appropriate delays as indicated. Sample measurements are then taken by differential pressure transmitter 5 and the average pressure change per unit time is derived using linear regression in the same manner as described in previous tests. The average leak rate measurement is compared against a value that has been correlated with brake fluid leak rate through the valve and a determination is made whether or not the leakage rate complies with the established specification. If non-compliance is indicated, further testing is terminated; otherwise the test sequence proceeds to the on and off time response tests of FIG. 8. At the conclusion of the energized valve seat leak rate test, valve 6 is opened and valve 8 is closed, followed by opening valve 10 and de-energizing the solenoid valve under test.

The on response test is conducted by first opening valves 2 and 8. The solenoid of the valve under test is buzzed (cycled) for forty cycles and left de-energized. Next an energizing voltage is applied to the solenoid and a timer is started at the instant that this voltage is applied. The application of energizing voltage to the solenoid will cause sphere 100 to travel from the solid line position of FIG. 1 to the broken line position. The voltage is a 9 volt step that is subsequently reduced to 6 volts. The seating of sphere 100 on ACT seat 104 will create a shock wave within the solenoid valve that is transmitted through nest 108 to an accelerometer 112 that is mounted on the nest. When accelerometer 112 detects the occurrence of this shock wave, a timer is stopped. The elapsed time represents the on response time of the valve under test and this measurement is compared against a correlated specification to determine compliance. If non-compliance is found further testing is terminated. Otherwise, the off response time test is conducted.

Figure 9:
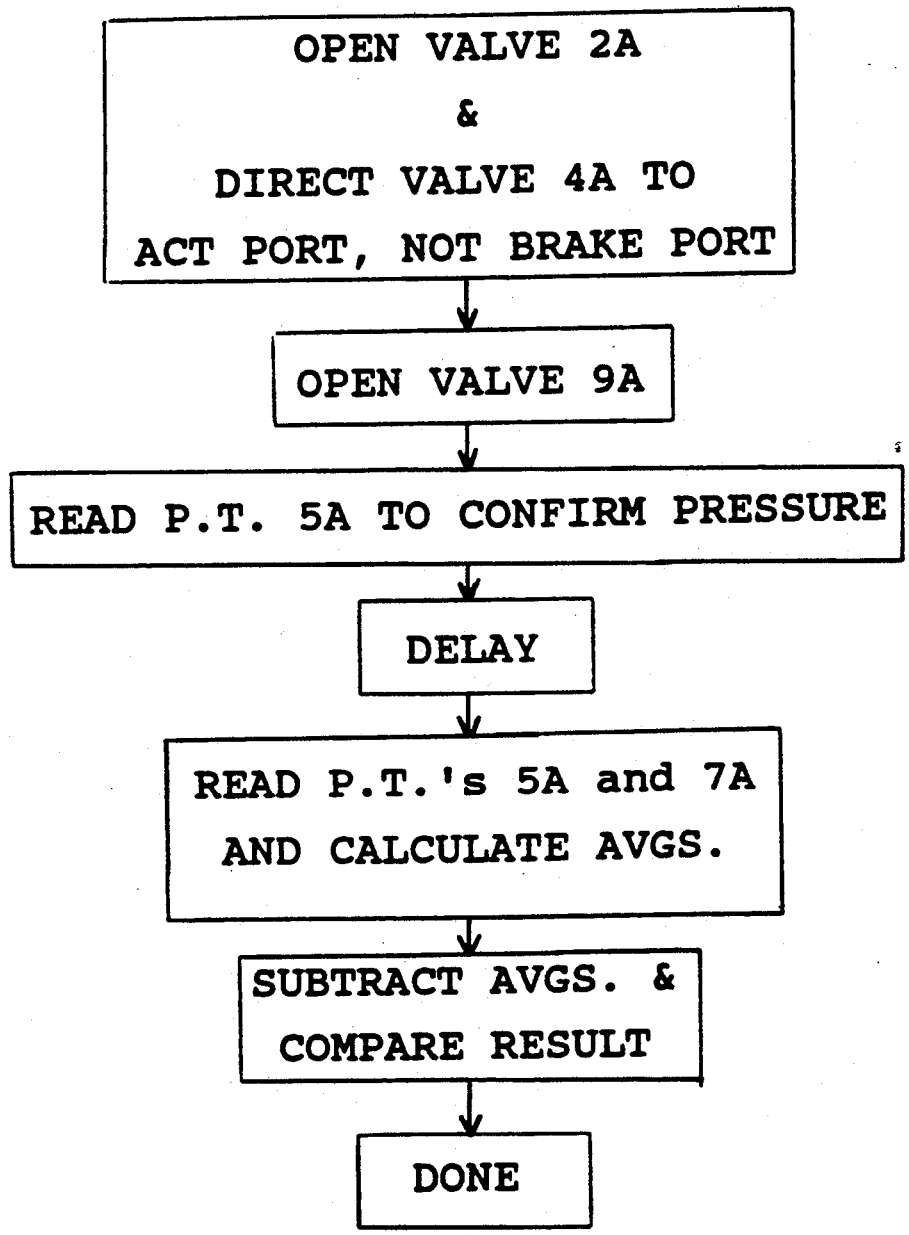
FIG. 9 is a block diagram illustrating steps of a sixth of the tests in the sequence of FIG. 4.

The energizing voltage is raised to a certain specified level, for example 12-14 volts, that would represent a typical maximum voltage that could be expected when the solenoid is put to actual use. After giving this voltage sufficient time to effective in establishing current in the solenoid, it is abruptly terminated. At the same time a timer is started. The termination of voltage on the solenoid causes the solenoid to become de-energized and sphere 100 will move from the broken line position back to the solid line position of FIG. When the sphere seats on ABS seat 102, a shock wave is transmitted through the solenoid valve under test and nest 108 to accelerometer 112. When the accelerometer detects the shock wave it stops the timer. The elapsed time represents the off response time of the solenoid valve under test, and it is compared to a correlated value to determine whether or not the valve is in compliance. If non-compliance is found further testing is terminated; otherwise testing proceeds to the de-energized flow test represented by FIG. 9.

The de-energized flow test is conducted by placing that portion of the test apparatus shown in FIG. 3 in association with the solenoid valve. Valve 2A is opened and valve 4A is operated to direct the regulated air pressure (60 kPa) to the ACT port of the valve under test and not to the junction between the BRAKE port of the valve under test and orifice 8A. Valve 9A is opened while valve 12A is closed. Thus, there is a flow path for regulated air pressure from pressure regulator 3A through valve 4A, through the solenoid valve under test between its ACT and BRAKE ports, through orifice 8A and valve 9A. Orifice 8A is sized in relation to the restriction in valve 11 between its ACT and BRAKE ports such that the flow rate through the valve between its ACT and BRAKE ports is related to the pressure differential across the ACT and BRAKE ports. Therefore, a number of measurements of the pressure at the ACT port are taken by pressure transducer 5A and a number of measurements of pressure at the BRAKE port are taken by pressure transducer 7A. The average pressure at the ACT port is calculated from these measurements as is the average pressure at the BRAKE port. The difference between the average measurements is compared with a predetermined value that has been correlated with brake fluid flow, and a determination is made as to whether or not the valve is in compliance with the appropriate flow rate specification. If compliance is found the testing is continued; if compliance is not found the testing is terminated.

Figure 10:
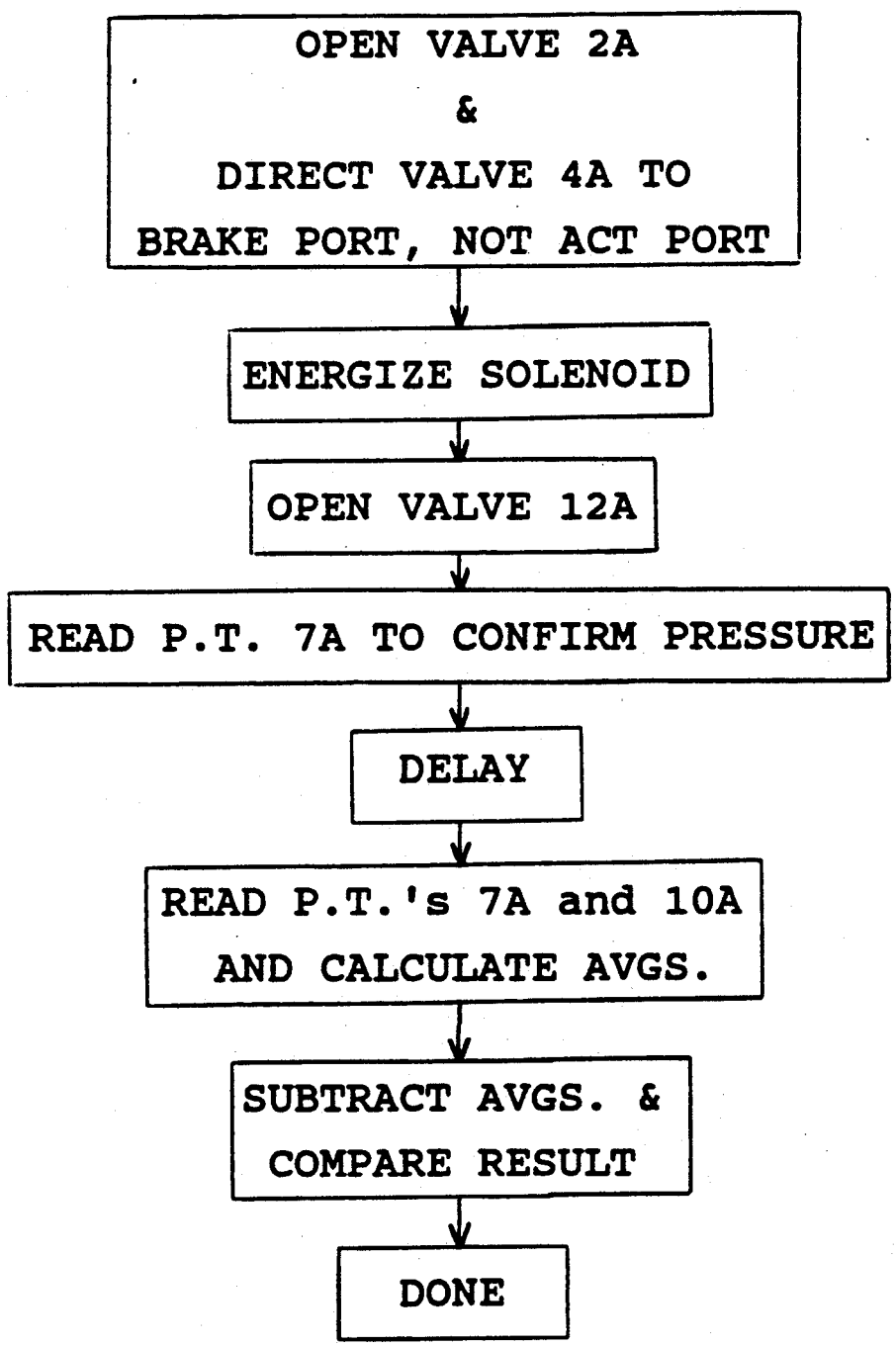
FIG. 10 is a block diagram illustrating steps in a seventh of the tests in the sequence of FIG. 4.

The final test performed on a solenoid valve is the energized flow rate test represented by FIG. 10. This is conducted by closing valve 9A, opening valve 12A and operating valve 4A to direct regulated pressure (60 kPa) directly to the BRAKE port while disconnecting regulated pressure from the ACT port. The valve is also energized to seat sphere 100 on seat 104. Air now flows from pressure regulator 3A through valve 4A to enter the valve under test at its BRAKE port. The air continues through the valve under test to exit the ABS port and pass through orifice 11A and valve 12A. Orifice 11A is sized in relation to the restriction through the valve between its BRAKE and ABS ports to cause a flow rate versus pressure differential relationship to exist between the BRAKE and ABS ports. The pressure differential measurement is obtained by taking a number of measurements of BRAKE port pressure via transducer 7A and averaging the results and by taking a number of measurements of ABS port pressure by means of pressure transducer 10A and averaging the results. The average ABS port pressure is subtracted from the average BRAKE port pressure, and this result is compared against a specified value that has been correlated with actual fluid flow to determine whether or not the valve under test is in compliance with the specified flow rate. If compliance is found the valve is deemed to have completed all testing.

Special care must be taken in the conditions of the solenoid valves to be tested and in the design and construction of the actual test apparatus which is schematically depicted in FIGS. 2 and 3. The solenoid valves must be thoroughly dry and clean during leak test since even a temporary thin film of finger oil that is present during the leak test may be sufficient to seal a leak path during the test and thereby prevent the leak path from being detected. The pneumatic test circuit components, including piping, must not only be air-tight, but also extremely rigid. Any distortions in the pneumatic test circuit's internal volume during the taking of pressure measurements will influence the test circuit. The development of this invention involved the discovery that minute distortions of the pneumatic test circuit that occur for even very small changes of pressure, such as a few mm. of water pressure differential, can de-sensitize the measurement of the pressure differential. Since the existence of a leak in a solenoid valve under test also affects the pressure measurements, a lack of sufficient rigidity in the pneumatic test circuit could result in distortion which de-sensitizes the measurement of said leak rate. This is why sufficient rigidity in the pneumatic circuit is necessary. Since the air pressure in the test circuitry is also a function of temperature, it is vital to have temperature stability throughout the test circuitry. It was discovered that even the use of solenoid actuators for various valves in the test apparatus was unacceptable because of the thermal energy input to the test air that was caused by solenoid actuation. A solution was provided by using air actuators.

Figure 11:
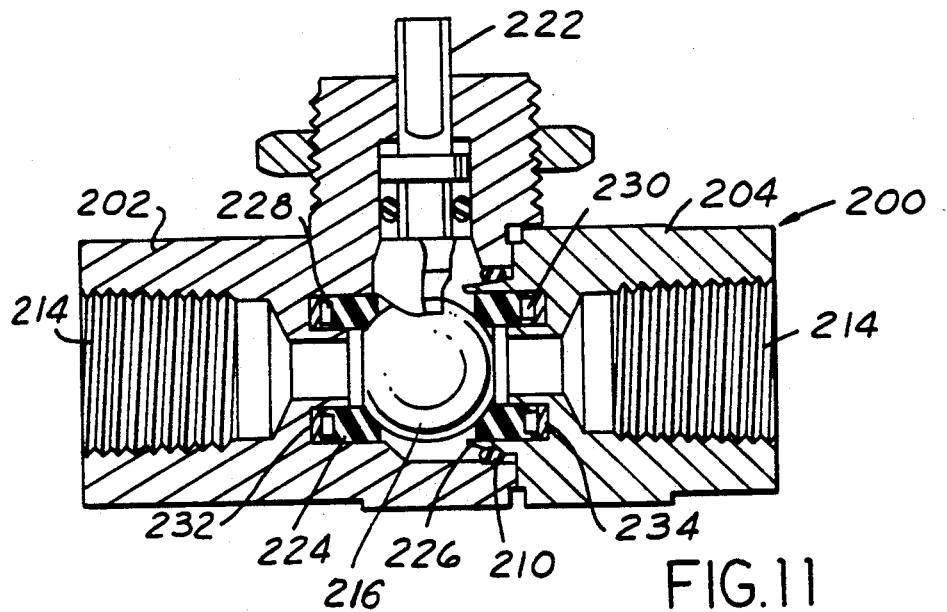
FIG. 11 is a cross-sectional view through one of the specific components that are illustrated in the test apparatus of FIGS. 2 and 3.
Figure 12:
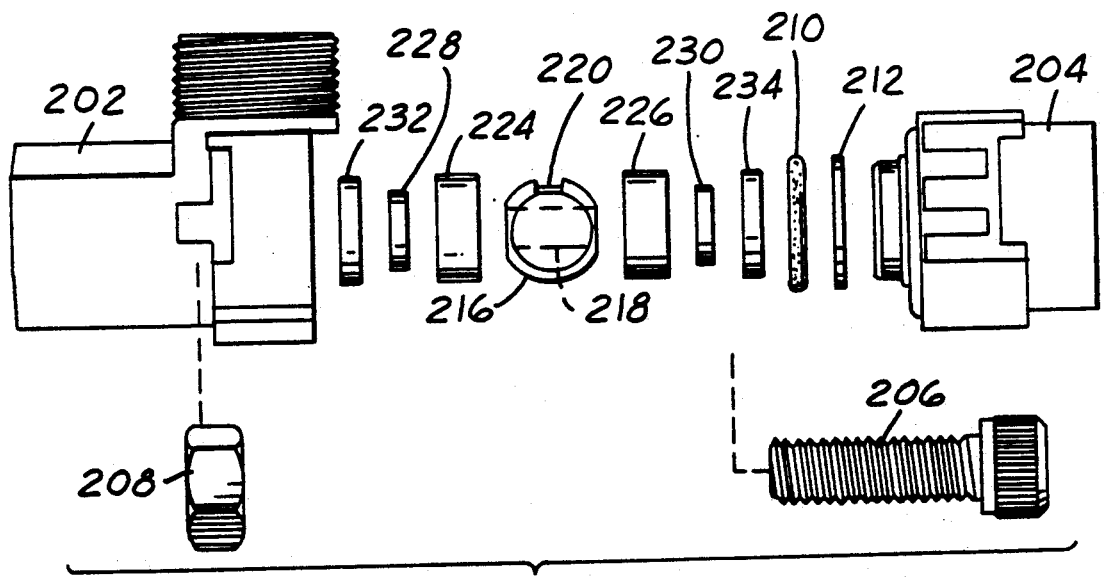
FIG. 12 is an exploded view illustrating further detail of FIG. 11.

FIGS. 11 and 12 disclose the construction details of a representative shut-off valve 200 that is used in the test apparatus. Valve 200 is derived from a valve of the type disclosed in U.S. Pat. No. 4,762,301 which comprises a body 202 and an end piece 204 which are held together in assembly by fastening means 206, 208. The joint between the two parts 202, 204 is sealed by an end-piece 0-ring 210 and an end piece back-up ring 212. The flow path 214 through valve 200 is controlled by a ball valve element 216 which has a through-hole 218 that aligns with flow path 214 when the shut-off valve is open. The top of element 216 contains a socket 220 to which is keyed the tip end of a stem 222 that is rotatably mounted in suitable packing in body 202. When stem 222 is rotated 90 degrees about its own axis from the position illustrated in FIG. 11, element 216 is rotated to place through-hole 218 at a right angle to flow path 214 so that the element blocks flow through the flow path. Seat rings 224, 226 engage element 216 from opposite sides. Each seat ring contains a groove that cooperates with the corresponding part 202, 204 in forming an O-ring space for receiving a corresponding O-ring seal 228, 230. The construction described thus far is like that of the valve of U.S. Pat. No. 4,762,301.

When the commercial valve of U.S. Pat. No. 4,762,301 was used in the test apparatus of the present invention, the valve was found to induce spurious pressure changes even though an air actuator was employed to operate it. A problem was traced to the failure of element 216 to maintain precise coaxiality with the stem as the element was rotated between open and closed conditions. This problem was solved by the inclusion of two thin plastic shim rings 232, 234 between the respective seat rings 224, 226 and the juxtaposed annular surfaces of the respective parts 202, 204 that confront the seat rings. The shim rings also assured that both seat rings maintained seal integrity with element 216 at all times.

The test apparatus is part of a computer-controlled test line. The positions to which the various valves of the test apparatus are operated during testing are under computer control. The measurements are taken by computer and the computations involving those measurements are performed by computer. The results of the computations are compared against the correlated specifications by computer to determine whether or not a solenoid valve under test is in compliance with those specifications.

It is important for differential pressure transmitter 5 to provide high resolution at low pressure measurements. A suitable piece of equipment for differential pressure transmitter 5 is a Rosemount differential pressure transmitter. The Rosemount transmitter has a range of 150 mm. of water and a resolution of 0.15 mm. of water, yet is capable of withstanding large "shocks", such as the 42,000 mm. of water differential that could appear across the transmitter if a valve under seat leak test lost all pressure during the test.

As mentioned in the beginning, the relatively low air pressure testing of solenoid valves which in use are required to handle liquid brake fluid, is premised upon a correlation of testing of the solenoid valves using air for the test medium to testing using liquid brake fluid for the test medium. While it will be the responsibility of the manufacturer of any particular solenoid valve to establish a proper correlation for its valve, the correlation technique that has been used by the present applicant has been found especially advantageous.

With respect to leak rate correlation, an essentially linear relationship between air leak rates and brake fluid leak rates was found to exist over a certain range of liquid leak rates. Appropriate statistical confidence limits were established for this relationship by testing a suitable sample size of solenoid valves. The upper confidence limit was used to distinguish a compliant solenoid valve from a non-compliant one. In this way, any solenoid valve whose leak rate under air test is found to exceed the upper confidence limit is deemed non-compliant.

Air-brake fluid correlations for the opening and closing times (on and off times) and for the flow rates were found in analogous fashion and appropriate upper confidence limits established.

As a result of the procedures that were employed, production quantities of solenoid valves tested in air possessed quality at least the equal of (and typically better than) those tested in brake fluid. Thus the displacement of brake fluid testing by air testing has accomplished significant economies in equipment, as well as in processing and maintenance expenditures, for the solenoid valve manufacturer.

What is claimed is:

1. Test apparatus for testing, using pressurized gas as a test medium, a solenoid valve which, in use, will control the flow of a liquid medium, said apparatus comprising:
   a test fixture for suitably supporting such a solenoid valve during testing, including means providing for gas-tight connection of a pneumatic test circuit to ports of the solenoid valve;
   means for causing one or more tests to be conducted on such a solenoid valve supported by said test fixture involving at least one test selected from a group of tests consisting of: leak testing; flow testing; and response testing;
   means to compare the result of said one or more tests with a specification that has been previously derived from an established correlation of the results of previously conducting said one or more tests on a number of such solenoid valves using gas as a test medium with the results of previously conducting said one or more tests on a number of such valves using liquid as a test medium.

2. Apparatus as set forth in claim 1 in which said specification includes a statistically derived confidence limit, and said means to compare the result of said one or more tests with said specification comprises means to declare the solenoid valve under test compliant with said specification if the result of said one or more tests does not fall beyond said confidence limit.

3. Apparatus as set forth in claim 1 in which said leak testing comprises means for charging the solenoid valve under test to a certain pressure through an open charge valve of the apparatus, means for closing the charge valve to isolate the solenoid valve from a reference pressure, and means for monitoring, over time, the pressure in the isolated solenoid valve versus the reference pressure.

4. Apparatus as set forth in claim 1 in which said response testing comprises means to start a timer at the beginning of the response test, and means to stop the timer at the end of the response test, said means to stop the timer comprising an accelerometer that is mounted on said fixture to sense the shock wave that is created by the valve element of the valve under test initially hitting a valve seat in the valve under test.

5. Apparatus as set forth in claim 1 in which said flow testing comprises orifice means in the pneumatic circuit connected in series with a flow path through the valve under test and means for measuring the pressure drop along a portion of the pneumatic circuit that supplies the valve under test and said orifice means.

6. Test methodology for testing, using pressurized gas as a test medium, a solenoid valve which, in use, will control the flow of a liquid medium, said methodology comprising:
   suitably supporting such a solenoid valve in a test fixture during testing, including providing for gas-tight connection of a pneumatic test circuit to ports of such a solenoid valve;
   causing one or more tests to be conducted on such a solenoid valve supported by said test fixture involving at least one test selected from a group of tests consisting of: leak testing; flow testing; and response testing;
   comparing the result of said one or more tests with a specification that has been previously derived from an established correlation of the results of previously conducting said one or more tests on a number of such solenoid valves using gas as a test medium with the results of previously conducting said one or more tests on a number of such valves using liquid as a test medium.

7. Methodology as set forth in claim 6 in which said specification includes a statistically derived confidence limit, and said comparing the result of said one or more tests with said specification comprises declaring the solenoid valve under test compliant with said specification if the result of said one or more tests does not fall beyond said confidence limit.

8. Methodology as set forth in claim 6 in which said leak testing comprises charging the solenoid valve under test to a certain pressure through an open charge valve of the apparatus, closing the charge valve to isolate the solenoid valve from a reference pressure, and monitoring, over time, the pressure in the isolated solenoid valve versus the reference pressure.

9. Methodology as set forth in claim 6 in which said response testing comprises starting a timer at the beginning of the response test, and stopping the timer at the end of the response test, said step of stopping the timer comprising monitoring an accelerometer that is mounted on said fixture to sense the shock wave that is created by a valve element of the valve under test initially hitting a valve seat in the valve under test.

10. Methodology as set forth in claim 6 in which said flow testing comprises providing orifice means in the pneumatic circuit connected in series with a flow path through the valve under test and measuring the pressure drop along a portion of the pneumatic circuit that supplies the valve under test and said orifice means.

* * * * *